(12) United States Patent
Yamashita et al.

(10) Patent No.: US 11,830,104 B2
(45) Date of Patent: Nov. 28, 2023

(54) IMAGE PROCESSING APPARATUS, CAMERA SYSTEM, AND IMAGE PROCESSING METHOD FOR SUPERIMPOSING AN IMAGE REPRESENTING A PART OF A VEHICLE BODY

(71) Applicant: Sony Semiconductor Solutions Corporation, Kanagawa (JP)

(72) Inventors: Yutaro Yamashita, Kanagawa (JP); Hirofumi Owaki, Kanagawa (JP); Takuya Yamaguchi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 276 days.

(21) Appl. No.: 17/293,860

(22) PCT Filed: Nov. 21, 2019

(86) PCT No.: PCT/JP2019/045553
§ 371 (c)(1),
(2) Date: Dec. 3, 2021

(87) PCT Pub. No.: WO2020/105698
PCT Pub. Date: May 28, 2020

(65) Prior Publication Data
US 2022/0084257 A1 Mar. 17, 2022

(30) Foreign Application Priority Data
Nov. 22, 2018 (JP) .................................. 2018-219514

(51) Int. Cl.
*G06T 11/00* (2006.01)
*B60R 1/25* (2022.01)
(Continued)

(52) U.S. Cl.
CPC ................ *G06T 11/00* (2013.01); *B60R 1/24* (2022.01); *B60R 1/25* (2022.01); *B60R 1/26* (2022.01);
(Continued)

(58) Field of Classification Search
CPC ....... G06T 11/00; G06T 3/60; G06T 2210/22; B60R 1/25; B60R 1/24; B60R 1/26; B60R 2300/304
See application file for complete search history.

(56) References Cited

U.S. PATENT DOCUMENTS

2003/0100976 A1* 5/2003 Watanabe .......... G01C 21/3688
701/1
2006/0125921 A1* 6/2006 Foote ..................... H04N 23/90
348/E5.055
(Continued)

FOREIGN PATENT DOCUMENTS

EP     3 291 545 A     3/2018
EP     3291545 A1     3/2018
(Continued)

OTHER PUBLICATIONS

International Search Report and English translation thereof dated Feb. 4, 2020 in connection with International Application No. PCT/JP2019/045553.
(Continued)

*Primary Examiner* — Terrell M Robinson
(74) *Attorney, Agent, or Firm* — Wolf, Greenfield & Sacks, P.C.

(57) ABSTRACT

An image processing apparatus includes a first signal processing unit for generating a first image of a first angle of view from an image captured by a camera attached to a
(Continued)

vehicle body, and an image superimposing unit for superimposing an image representing a part of the vehicle body on the first image.

16 Claims, 19 Drawing Sheets

(51) Int. Cl.
    *B60R 1/24*     (2022.01)
    *B60R 1/26*     (2022.01)
    *G06T 3/60*     (2006.01)

(52) U.S. Cl.
    CPC .......... *G06T 3/60* (2013.01); *B60R 2300/304* (2013.01); *G06T 2210/22* (2013.01)

(56) References Cited

U.S. PATENT DOCUMENTS

| | | | |
|---|---|---|---|
| 2006/0228037 A1* | 10/2006 | Simon | G06V 40/162 382/254 |
| 2009/0022423 A1* | 1/2009 | Ehlgen | G06T 11/00 382/284 |
| 2010/0134519 A1 | 6/2010 | Yamada | |
| 2011/0043632 A1 | 2/2011 | Satoh | |
| 2012/0069182 A1* | 3/2012 | Sumi | H04N 7/181 348/148 |
| 2012/0176406 A1* | 7/2012 | Elenbaas | A61B 6/5241 345/629 |
| 2018/0332243 A1 | 11/2018 | Aihara et al. | |

FOREIGN PATENT DOCUMENTS

| | | |
|---|---|---|
| GB | 2535536 A | 8/2016 |
| JP | 2005-86754 A | 3/2005 |
| JP | 2005-150938 | 6/2005 |
| JP | 2016-001109 A1 | 1/2016 |
| JP | 2016001109 A | 1/2016 |
| WO | WO 2018/207393 A1 | 11/2018 |

OTHER PUBLICATIONS

Written Opinion and English translation thereof dated Feb. 4, 2020 in connection with International Application No. PCT/JP2019/045553.

International Preliminary Report on Patentability and English translation thereof dated Jun. 3, 2021 in connection with International Application No. PCT/JP2019/045553.

Communication pursuant to Article 94(3) EPC dated Mar. 16, 2023 in connection with European Application No. 19887308.5.

* cited by examiner

Camera image

Camera image

Rear view image

Normal view

Wide view

Top-down view

IMAGE PROCESSING APPARATUS, CAMERA SYSTEM, AND IMAGE PROCESSING METHOD FOR SUPERIMPOSING AN IMAGE REPRESENTING A PART OF A VEHICLE BODY

CROSS-REFERENCE TO RELATED APPLICATIONS

This application claims the benefit under 35 U.S.C. § 371 as a U.S. National Stage Entry of International Application No. PCT/JP2019/045553, filed in the Japanese Patent Office as a Receiving Office on Nov. 21, 2019, which claims priority to Japanese Patent Application Number JP2018-219514, filed in the Japanese Patent Office on Nov. 22, 2018, each of which is hereby incorporated by reference in its entirety.

TECHNICAL FIELD

The present invention relates to an image processing apparatus, a camera system, a monitor apparatus, and an image processing method for processing an image of a camera installed in a vehicle body.

BACKGROUND ART

Recently, when moving backward the vehicle body in a parking or the like, by presenting a rear image captured by a camera to a driver through a screen of a car navigation system, the vehicle body mounting a rear view camera for supporting a parking operation is increasing. Many rear view cameras display images behind the vehicle body, including a portion of a rear bumper, on a rear view screen by including a portion of the rear bumper in a capturing field of view. Thus, the driver will grasp a sense of distance in a rear view image space with reference to the rear bumper (see Patent Literature 1).

On the other hand, in order to realize a vehicle without a rear view mirror or the like, a vehicle body equipped with a camera monitoring system (CMS) instead of the rear view mirror or the like is also increasing. The CMS is expected to realize a vehicle with superior safety, such as providing a rear image with a smaller blind spot and a wider field of view.

CITATION LIST

Patent Literature

Patent Literature 1: Japanese Patent Application Laid-open No. 2005-150938 (FIG. 3, paragraphs [0016] and [0029])

DISCLOSURE OF INVENTION

Technical Problem

Although both the rear view camera and the CMS described above provide the driver with the image of the rear of the vehicle body, the rear view camera is intended to monitor a situation of the rear of the vehicle body. In contrast, the CMS is intended to monitor a subsequent vehicle of the vehicle body. Therefore, the rear view camera and the CMS camera have different heights of the capturing field of view. For this reason, it is common that separate cameras having the different capturing fields of view are used for each. However, in order to suppress a total cost, it is desirable to realize the rear view and the CMS by one camera or to realize the rear view by using a camera for the CMS.

However, when an attempt is made to realize the rear view using the image of the CMS camera, various problems have occurred due to a fact that the bumper of the vehicle body is not included in the capturing field of view of the CMS camera.

In view of the above circumstances, an object of the present technology is to provide an image processing apparatus, a camera system, and an image processing method capable of providing a high-quality rear view image.

Solution to Problem

In order to solve the above problems, an image processing apparatus according to the present technology includes a first signal processing unit for generating a first image of a first angle of view from an image captured by a camera attached to a vehicle body, and an image superimposing unit for superimposing an image representing a part of the vehicle body on the first image.

According to the image processing apparatus according to the present technology, by superimposing the image representing the part of the vehicle body on the first image generated from the image captured by the camera, it is possible to obtain a captured image that a user easily gasps a sense of distance with reference to the part of the vehicle body.

The image of the part of the vehicle body may be an image stored in advance.

More specifically, the image stored in advance may be an image stored in the first signal processing unit before the image of the camera is acquired.

The image of the part of the vehicle body may be an image of an area outside a field of view of the camera.

The image of the part of the vehicle body may be a virtual image obtained by virtualizing at least a part of a bumper of the vehicle body.

The camera is a camera attached for capturing a front, a rear or a side of the vehicle body.

The image superimposing unit may be configured to adjust the virtual image that is superimposed on the first image on the basis of speed information of the vehicle body.

The image superimposing unit may be configured to superimpose an embedded image on a gap area in which an image between the first image and the virtual image does not exist.

The embedded image may be an image having a hue close to that of the first image adjacent to the gap area.

The image superimposing unit may be configured to clip an image of an area corresponding to the gap area from the first image in the past to generate the embedded image.

The image superimposing unit may be configured to output an image in which at least the image is superimposed on the first image to a first display unit.

The image processing apparatus according to the present technology may further include a second signal processing unit that generates a second image having a second angle of view different from the first angle of view from the first image and outputs the second image to a second display unit.

A center of the second angle of view may be higher than a center of the first angle of view in the first image space.

A camera system according to another aspect of the present technology includes a camera attached to a vehicle body, a first signal processing unit for generating a first image of a first angle of view from an image captured by the camera, and an image superimposing unit for superimposing an image representing a part of the vehicle body to the first image.

An image processing apparatus according to still another aspect of the present technology includes a first signal processing unit for generating a first image of a first angle of view from an image captured by a camera attached to a vehicle body, an image superimposing unit for superimposing an image representing a part of the vehicle body on the first image, and a speed detecting unit for detecting a speed of the vehicle body, in which the image superimposing unit is configured to adjust the image superimposed on the image on the basis of the detected speed.

A signal processing method according to still another aspect of the present technology includes generating a first image of a first angle of view from an image captured by a camera attached to a vehicle body by a first signal processing unit, and superimposing an image representing a part of the vehicle body on the first image by an image superimposing unit.

MODE(S) FOR CARRYING OUT THE INVENTION

Figure 1:
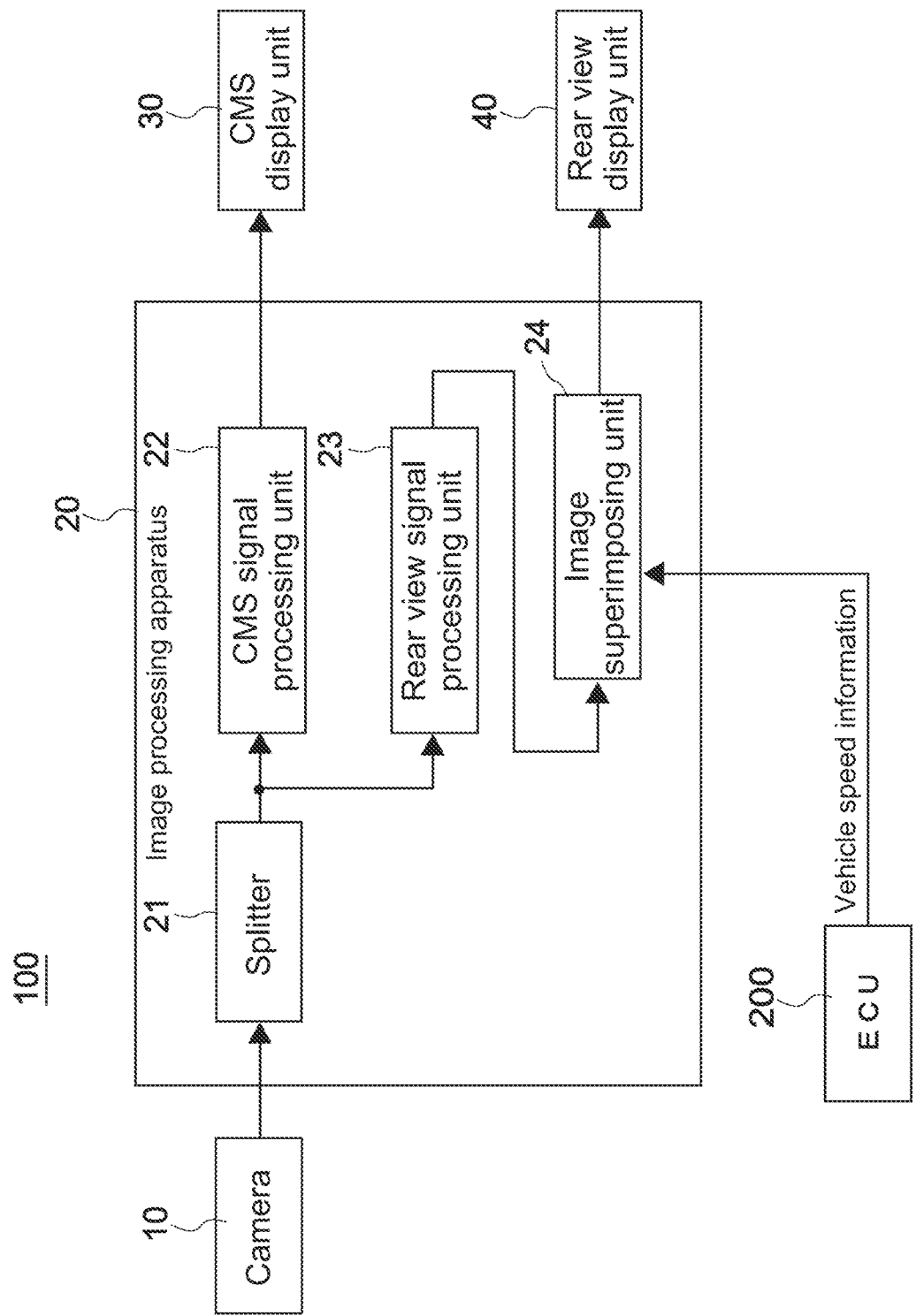
FIG. 1 is a block diagram showing an overall configuration of a camera system 100 according to the present technology.

Embodiments of the present technology will be described in the following order with reference to the drawings.
1. Overall system configuration
2. Configuration of image processing apparatus 20
3. Image superimposing processing
4. Adjusting virtual image corresponding to vehicle speed
5. Embedding past image
6. Switching rear view mode
7. Overall control flow
8. Modification First Embodiment (1. Overall System Configuration)

FIG. 1 is a block diagram showing an overall configuration of a camera system 100 according to the present technology.

The camera system 100 includes a camera 10, an image processing apparatus 20, a CMS display unit 30, and a rear view display unit 40.

The CMS display unit 30 and the rear view display unit 40 are separate monitors that can be viewed by a driver of a vehicle body 60. The CMS display unit 30 may be a monitor or the like that substitutes a room mirror such as a rear view mirror, a door mirror, or the like. The rear view display unit 40 may be, for example, a screen of a car navigation system.

Figure 2:
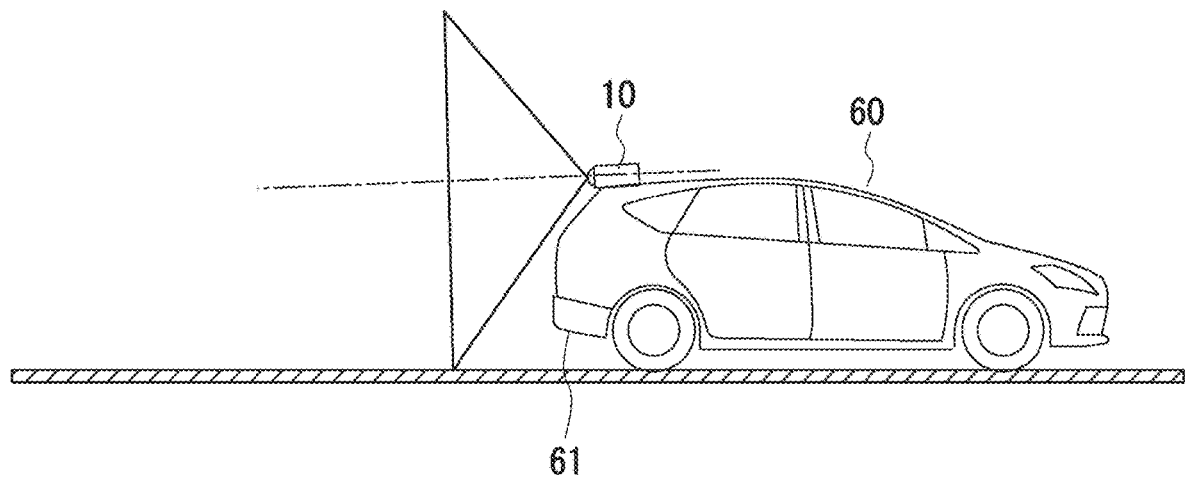
FIG. 2 is a side view showing an attachment position and an orientation of the camera 10 in the camera system 100 of FIG. 1
Figure 3:
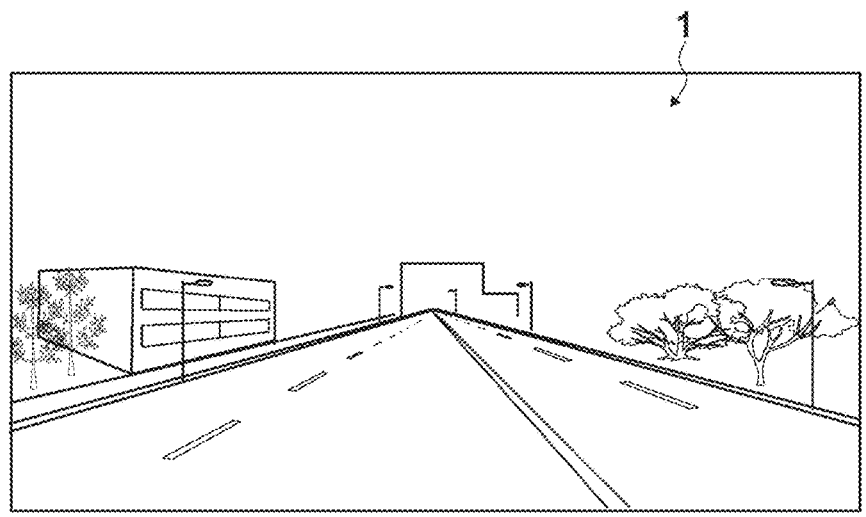
FIG. 3 is a diagram showing an example of a view image of the camera 10 of FIG. 2

FIG. 2 is a side view showing an attachment position and orientation of the camera 10 in the camera system 100 of FIG. 1, and FIG. 3 is a diagram showing an example of a view image of the camera 10 of FIG. 2. Note that the present embodiment assumes that the camera 10 is arranged at a rear of the vehicle body so as to be capable of capturing the rear of the vehicle body 60. It is not limited thereto, and the camera 10 may be arranged so as to be capable of capturing a front of the vehicle body 60.

The camera 10 is a digital video camera which mounts a CCD sensor or a CMOS sensor, preferably a high resolution (HD: High Definition) digital video camera. As shown in FIG. 2 and FIG. 3, the camera 10 of the camera system 100 is installed such that an optical axis is substantially horizontally or slightly inclined downward at a relatively high position such as a top portion of the rear of the vehicle body 60 so as to be able to capture a distant place. In the case of such a camera arrangement, a bumper such as a rear bumper 61 of the vehicle body 60 is out of a field of view of the camera 10. Therefore, when attempting to use the camera system 100 to monitor the rear of the vehicle body in place of the rear view mirror, for example, there is a problem that a sense of a distance of the rear of the vehicle body is difficult to grasp an image 1 of the camera (see FIG. 3) due to no image of the rear bumper 61. This is one of the problems to be solved by the present technology.

(2. Configuration of Image Processing Apparatus 20)

An image processing apparatus 20 includes at least a first signal processing unit (rear view signal processing unit 23) for generating a first image of a first angle of view from an image captured by the camera 10 attached to the vehicle body 60, and an image superimposing unit 25 for superimposing an image representing a part of the vehicle body 60 on the first image.

More specifically, the image processing apparatus 20 generates an image for the CMS from the image captured by the camera 10 and supplies it to the CMS display unit 30, while generating an original image for rear view from the image captured by the camera 10, generating a rear view image in which at least an image such as a virtual rear bumper (hereinafter referred to as a "virtual image") is superimposed on the original image for rear view, and supplying it to the rear view display unit 40.

Note that the method of superimposing the virtual image on the original image for rear view includes a method of adjusting a position of the virtual image on the basis of a vehicle speed and a method of superimposing the virtual image on a fixed position regardless of the vehicle speed, and the former method will be described in the first embodiment and the latter method will be described in the second embodiment.

As shown in FIG. 1, the image processing apparatus 20 includes, for example, a splitter 21, a CMS signal processing unit 22 (second signal processing unit), the rear view signal processing unit 23, an image superimposing unit 24, and the like. The image processing apparatus 20 includes, for example, an integrated circuit such as an IC (Integrated Circuit) and an LSI (large-scale integrated circuit), and a memory for buffering.

The splitter 21 supplies an image 1 captured by the camera 10 (see FIG. 3) to the CMS signal processing unit 22 and the rear view signal processing unit 23.

The CMS signal processing unit 22 generates a CMS image to be supplied to the CMS display unit 30 by clipping an image of a target area of CMS signal processing and performing an image quality adjustment such as a distortion correction depending on a view mode and a white balance adjustment from the image 1 supplied through the splitter 21.

Figure 4:
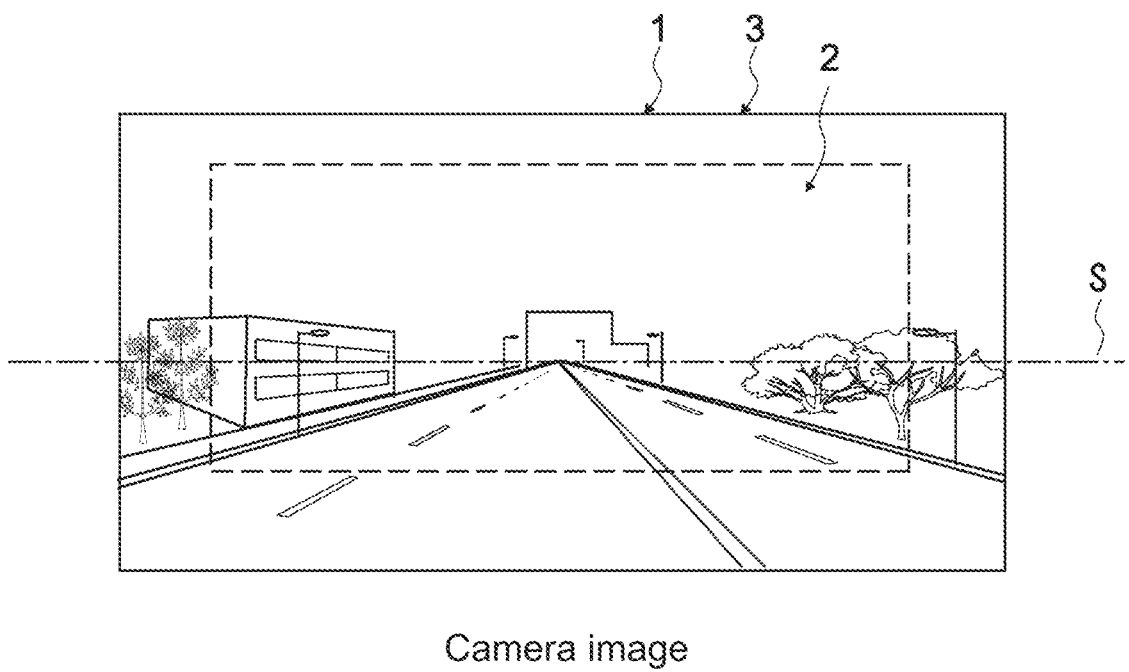
FIG. 4 is a diagram showing an example of a positional relationship between an image space of the camera 10 and a CMS image space.

FIG. 4 is a diagram showing an example of a positional relationship between an image space of the camera 10 and a CMS image space. As shown in the same figure, the CMS signal processing unit 22 generates the CMS image by clipping an image area 2 corresponding to an image angle portion from the image 1 of the camera as the target area of the CMS signal processing such that a distant subject is taken as a main subject and a horizontal line S is slightly lower than a height of a substantially middle.

The rear view signal processing unit 23 generates the original image for rear view by clipping an image of a target area of rear view signal processing and performing the image quality adjustment such as the distortion correction depending on the view mode and the white balance adjustment from the image 1 of the camera. Note that the rear view signal processing unit 23 may process all pixels of the image 1 of the camera 10. FIG. 4 shows the case where all pixels of the image 1 of the camera 10 are used as an original image 3 for rear view in this way. The original image 3 for rear view refers to an image of the camera including only the image of the camera 10 before the virtual image or the embedded image of the bumper to be described later is superimposed, and is hereinafter referred to as a "rear view original image 3". An image obtained by superimposing the virtual image or the embedded image of the bumper, which will be described later, on the rear view original image 3 is a "rear view image 6".

The image processing apparatus 20 has a communication interface (not shown) for communicating with an ECU (Engine Control Unit) 200 mounted on the vehicle body 60. A communication protocol with the ECU 200 include a CAN (Controller Area Network) or the like. The image superimposing unit 24 receives status information such as vehicle speed information from the ECU 200 using the communication interface described above, and adjusts the position of the virtual image on the basis of the vehicle speed information received. Details of the superimposing processing of the virtual image by the image superimposing unit 24 will be described later.

(3. Image Superimposing Processing)

Figure 5:
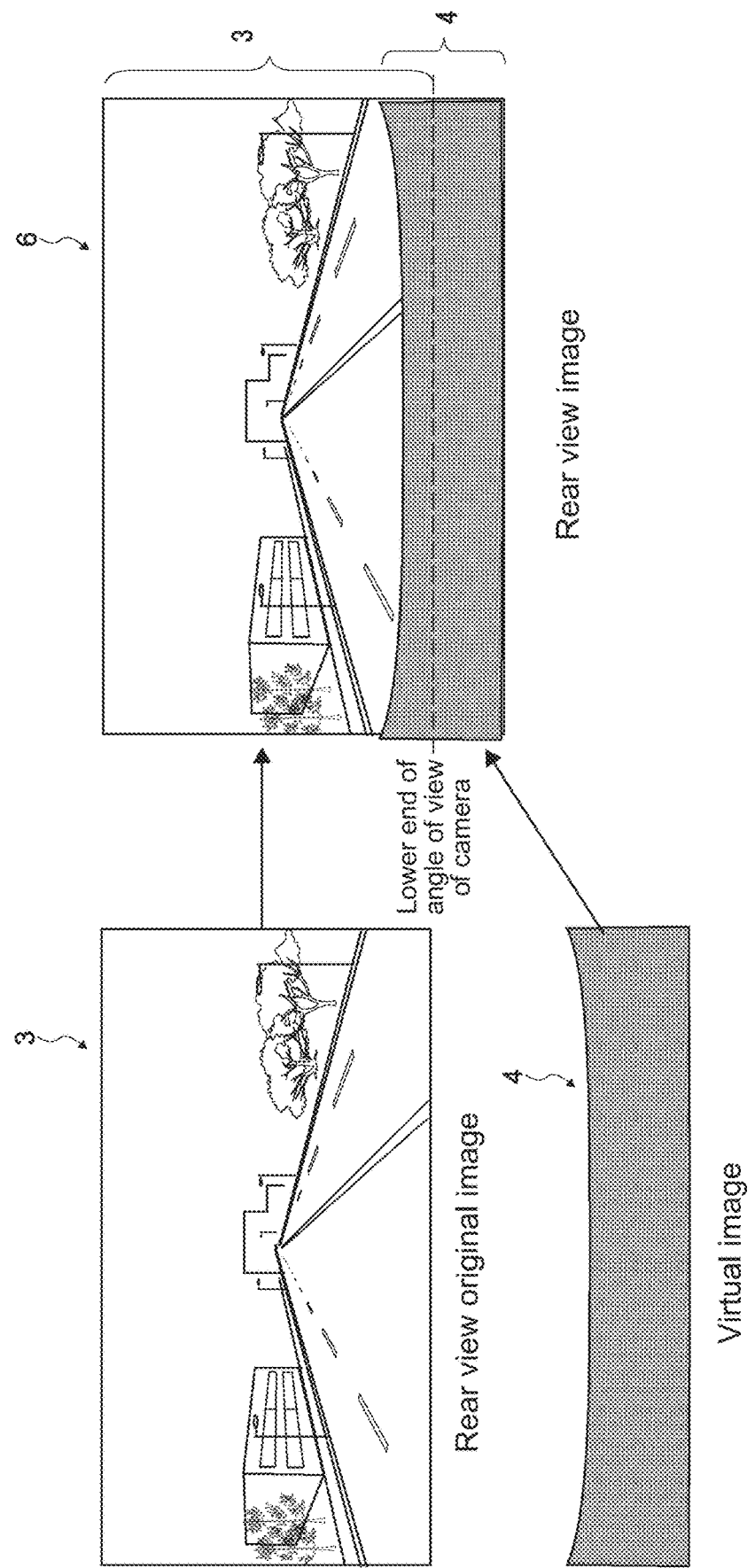
FIG. 5 is a diagram showing a configuration example of a rear view image 6.

FIG. 5 is a diagram showing a configuration example of the rear view image 6. The image superimposing unit 24 superimposes the image representing a part of the vehicle body such as, for example, the rear bumper that is not present in the field of view of the camera 10 on the rear view original image 3 generated by the rear view signal processing unit 23 as a virtual image 4 and generates the rear view image 6. The virtual image 4 is, for example, an image created in advance by computer graphics or the like, and is information stored in a non-volatile memory (not shown) in the image processing apparatus 20 before the image is supplied from the camera 10 to the image processing apparatus 20 or before the system is started up. Note that the image to be superimposed on the rear view original image 3 is not necessarily an image created by computer graphics or the like, and may be, for example, an image processed from a photograph. In this specification, the image created by computer graphics and the like and the mage photography processed are collectively referred to as the "virtual image 4".

Figure 6:
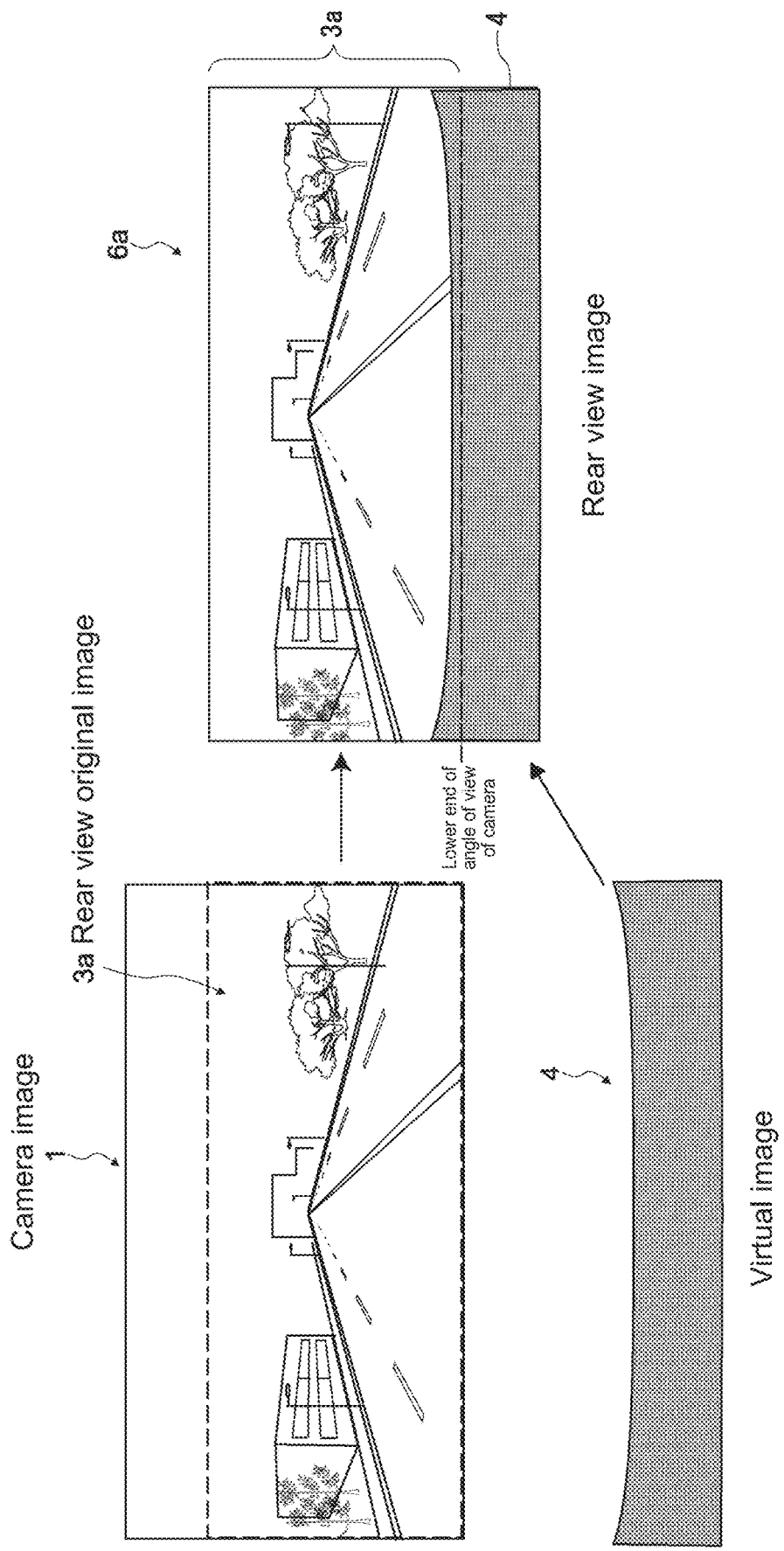
FIG. 6 is a diagram showing another configuration example of the rear view image 6.

Note that, in FIG. 5, the case is shown in which a rear view image 6 is generated by using all pixels of the image 1 of the camera 10 as the rear view original image 3, but the present technology is not limited thereto. For example, as shown in FIG. 6, a partial rectangular area including the lowest area of the image 1 of the camera 10 may be used as the rearview original image 3a, and the rearview image 6a may be generated by superimposing the virtual image 4 or the like on the partial rectangular area.

(4. Adjusting Virtual Image Corresponding to Vehicle Speed)

The image superimposing unit 24 can adjust the position of the virtual image 4 to be superimposed on the rear view image 6, and the like, on the basis of the vehicle speed information obtained from the ECU 200.

Figure 7:
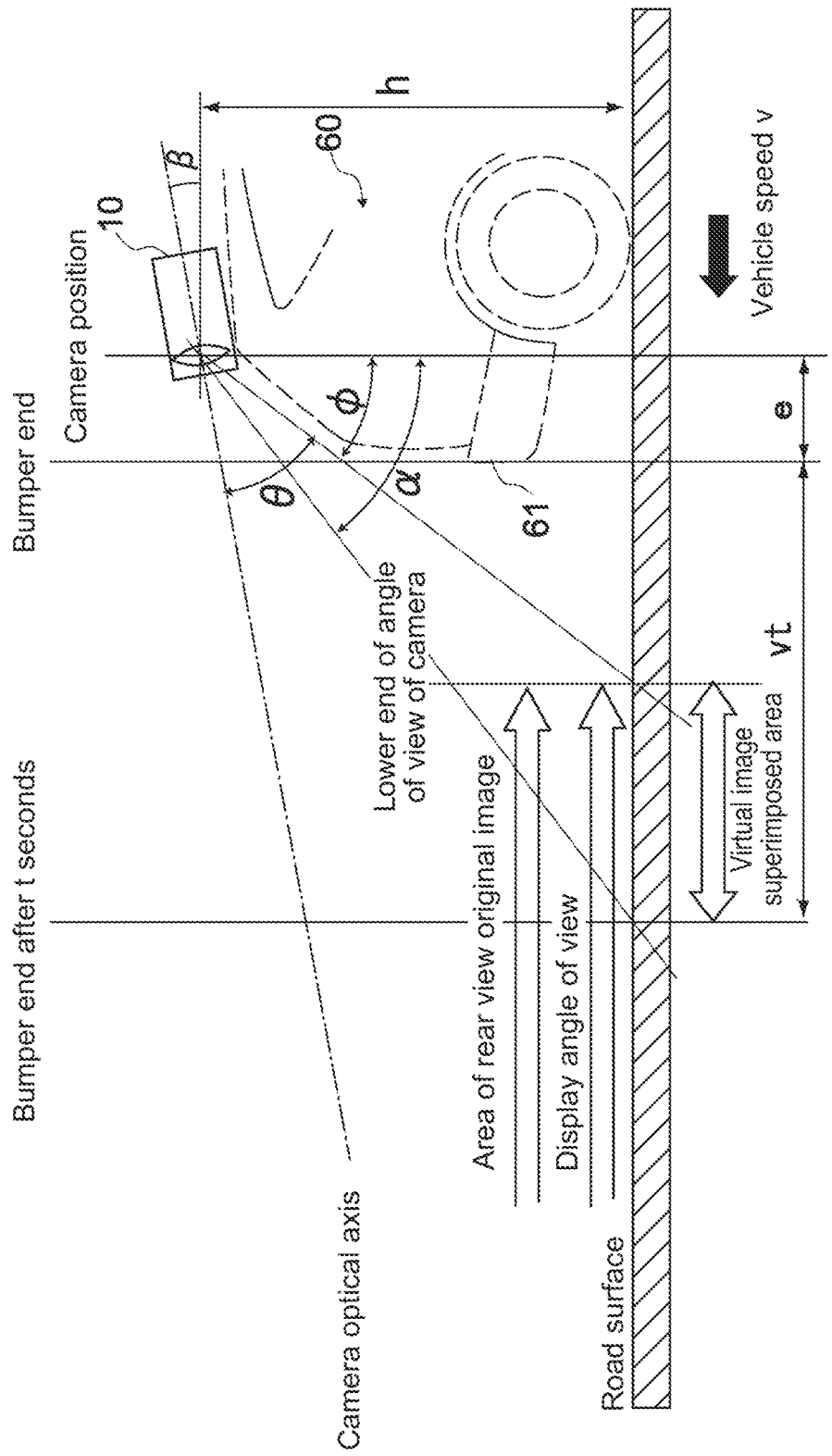
FIG. 7 is a diagram explaining an adjustment method of a virtual image 4 according to a vehicle speed.

FIG. 7 is a diagram explaining an adjustment method of the virtual image 4 according to the vehicle speed.

In the same figure, h is an installation height of the camera 10, $\theta$ is an angle between a lower end of the angle of view of the camera 10 and a camera optical axis of a light beam, $\varphi$ is an angle between the lower end of the angle of view of the camera 10 and a vertical of the light beam, t is a timing parameter which is preset in the image superimposing unit 24.

Here, supposing a slope of the optical axis of the camera 10 with respect to the horizontal, φ is calculated by the following formula: $\varphi = 90 - \theta - \beta$ (1).

The timing parameter t is a parameter for displaying the virtual image 4 taking as an end a point where the rear bumper 61 of the vehicle body 60 reaches after t seconds at a current speed while moving backward the vehicle body. The timing parameter t may be changed arbitrarily by a user. Here, the virtual image shows an area where the vehicle reaches after t seconds/within t seconds in a case where the vehicle is moved backward at the current speed.

In addition, the virtual image may be superimposed as a translucent image and displayed such that a status of the area of the rear view original image 3 on which the virtual image is superimposed can be confirmed by the driver.

First, the image superimposing unit 24 determines a display position of the virtual image 4 from h, t, and the vehicle speed v by the following formula. If the angle of view of the rear view original image 3 is set as a display angle of a whole rear view, a calculation target of the display position of the virtual image 4 is how far the position away from the lower end of the display angle of the whole rear view is set as an upper end of the virtual image 4. An upper end position of the virtual image 4 corresponds to a point moved by vt+e from the position of the camera 10. Therefore, the image superimposing unit 24 first calculates vt+e. Incidentally, e is a distance from the position of the camera 10 to an end of the rear bumper 61.

Next, α is calculated from a calculation result of vt+e. α is an angle with respect to the vertical of a direction from the camera 10 to the point vt+e on a road surface. α is calculated by the following formula: $\alpha = \tan^{-1}((vt+e)/h)$ (2).

Therefore, the greater the vehicle speed is, the more leftward the upper end position of the virtual image 4 in FIG. 7.

Next, the image superimposing unit 24 superimposes the virtual image 4 in an area from the lower end of the rear view original image 3 to a position corresponding to the angle of α calculated by the above-described equation (2) on the rear view original image 3 (upper end position of virtual image 4). Thus, the virtual image 4 is superimposed on an appropriate position of the rear view original image 3, thereby obtaining the rear view image 6 having a sense of distance with reference to the vehicle body 60 that can be easily grasped.

Incidentally, if the vehicle speed v is excessively great, most of the area of the rear view image 6 is occupied by the virtual image 4, and a space behind the vehicle body visible from the user through the rear view display unit 40 becomes too narrow. Therefore, the image superimposing unit 24 superimposes the virtual image 4 only when the following condition is satisfied: $\theta/2 < \theta + \varphi - \alpha < \theta$ (3).

If the above equation (3) is not satisfied, only the rear view original image 3 is displayed on the rear view display unit 40 as the rear view image 6. As a result, it is possible to prevent the image space behind the vehicle body, which can be seen by the user through the rear view display unit 40, from becoming too narrow.

Second Embodiment

Next, a second embodiment according to the present technology will be described.

In the present embodiment, the image superimposing unit 24 superimposes the virtual image 4 on the rear view original image 3 in a static positional relationship without relying on the vehicle speed.

Figure 8:
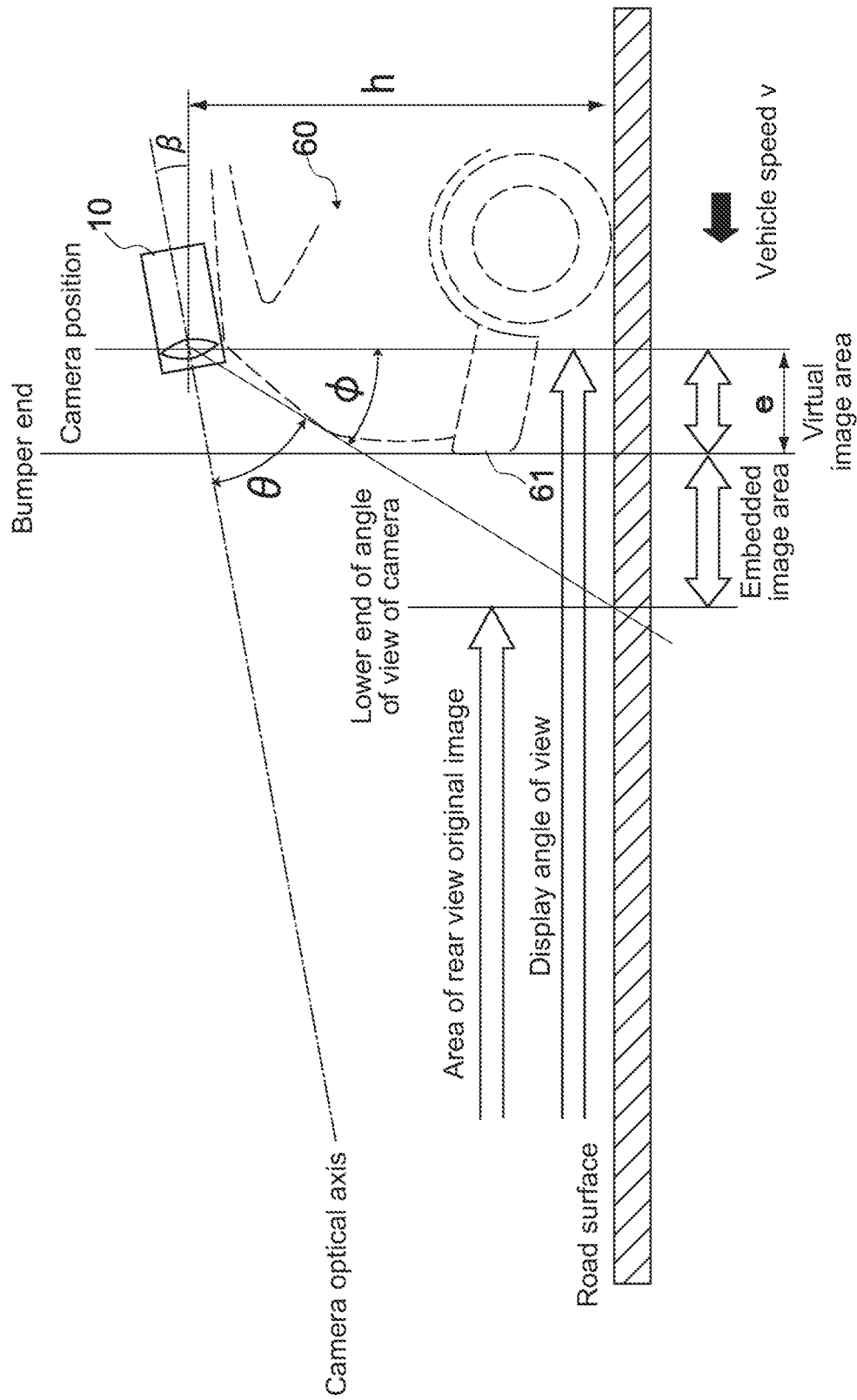
FIG. 8 is an explanatory view of a method of superimposing the virtual image 4 with respect to a rear view original image 3 in a static positional relationship in a second embodiment according to the present technology.
Figure 9:
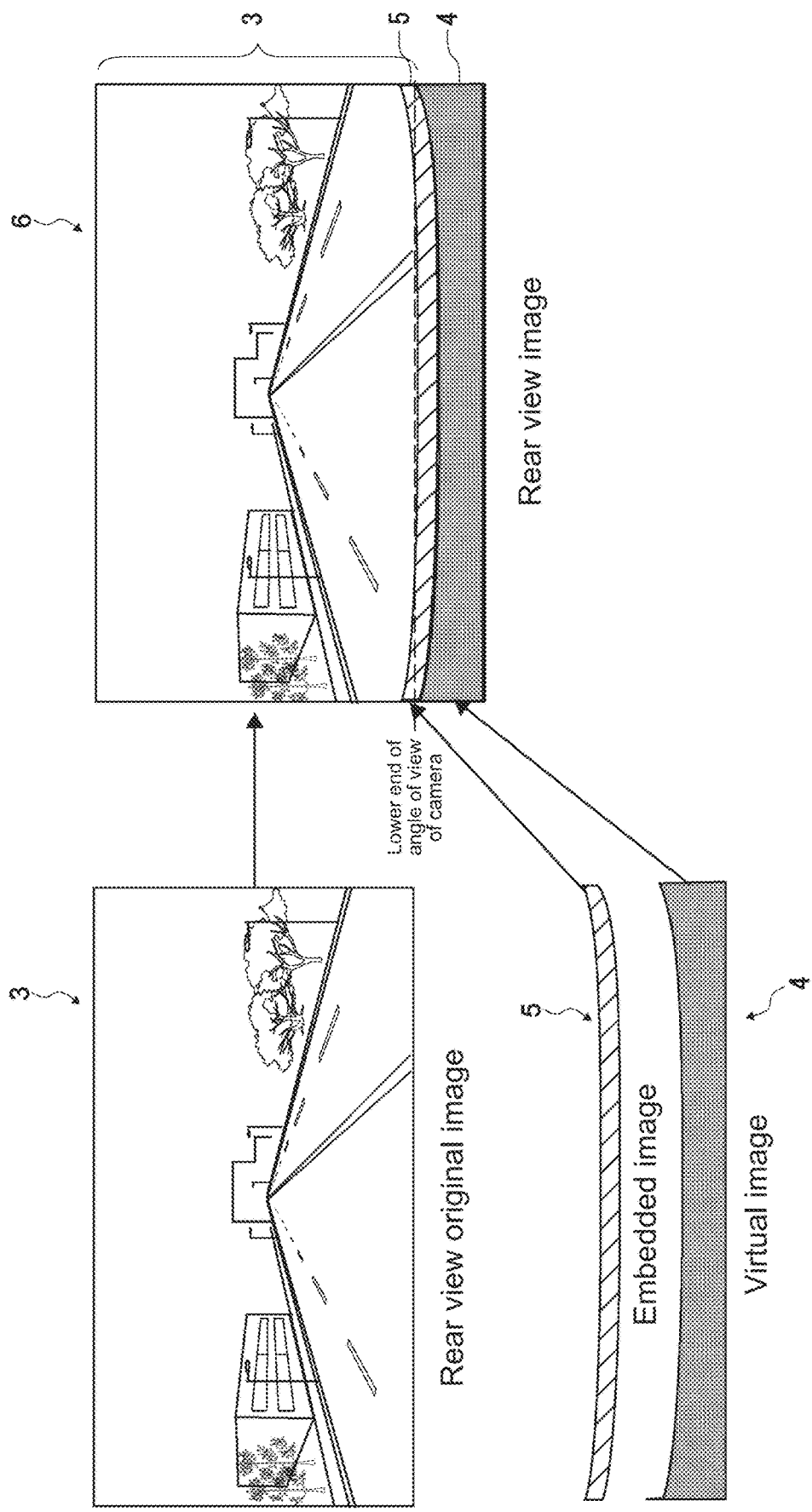
FIG. 9 is a diagram showing an example of a rear view image in the second embodiment.

FIG. 8 is an explanatory view of a method of superimposing the virtual image 4 in the static positional relationship with respect to the rear view original image 3 in the second embodiment, and FIG. 9 is a diagram showing an example of the rear view image in the present embodiment.

Figure 10:
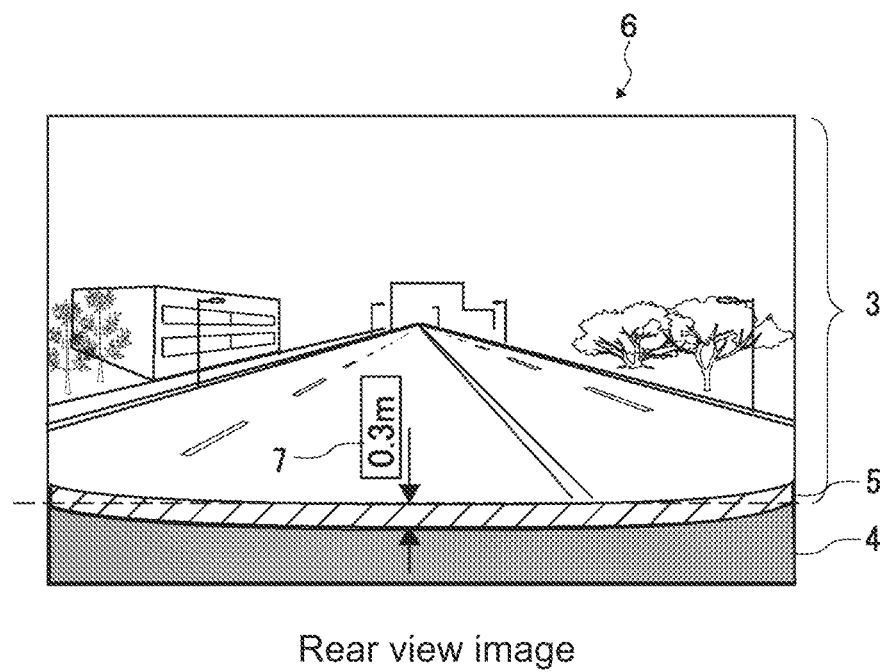
FIG. 10 is a diagram showing another example of the rear view image of in the second embodiment.

As shown in these figures, the virtual image 4 is arranged at a position corresponding to an area from the position of the camera 10 to the end of the rear bumper 61 of the vehicle body 60 in the display space of the rear view display unit 40. At this time, there may be a gap area in the display space of the rear view display unit 40 in which no image exists between the rear view original image 3 and the virtual image 4. The image superimposing unit 24 embeds an embedded image 5 in the gap area for facilitating a discrimination from the virtual image 4. The embedded image 5 is preferably an image having a characteristic different from that of the virtual image 4 by hatching lines, shading, a color, or the like, for example. For the embedded image 5, it is more preferable to use a color close to a hue of the rear view original image 3 in the vicinity of the gap area, because it is easy to discriminate from the virtual image 4. Furthermore, as shown in FIG. 10, the embedded image 5 may be superimposed with character information 7 having a value indicating a distance in the real space of a gap between the rear view original image 3 and the virtual image 4.

(5. Embedding of past image)

For the embedded image 5, a past image, for example, an image clipped from an image one frame before may be used. This processing is performed by using the rear view original image 3 in the past held in a buffer while the vehicle body 60 moves backward.

Figure 11:
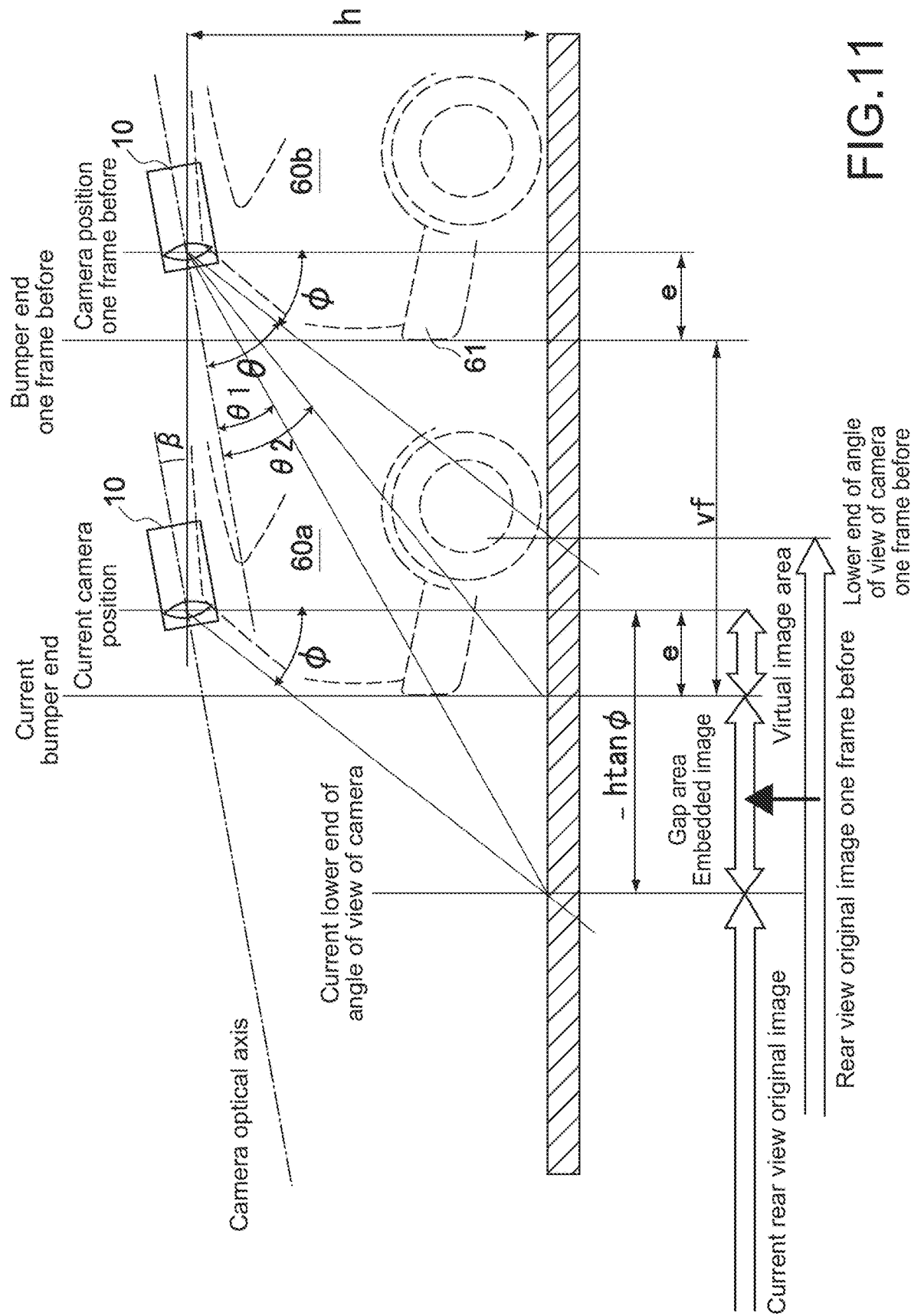
FIG. 11 is an explanatory view of embedding processing by a past image.

FIG. 11 is an explanatory diagram of embedding processing by a past image.

60a is the vehicle body at a current position, and 60b is the vehicle body of the position one frame before. Vf is a distance in which the vehicle body moves at a speed v between frames, and f is a frame period.

The gap area between the rear view original image 3 captured at the current position of the vehicle body 60a and the virtual image 4 is filled with an image of an angle range from θ1 to θ2 with respect to the camera optical axis in the rear view original image 3 captured one frame before. θ1 and θ2 are angles calculated by the following: $\theta 1 = \theta + \varphi - \tan^{-1}((h \tan \varphi + vf)/h)$ (4), $\theta 2 = \theta + \varphi - \tan^{-1}((vf+e)/h)$ (5).

Thus, by filling the gap area between the lower end of the angle of view by the current camera 10 and the virtual image 4 with an image of the same area one frame before, it is possible to obtain a more natural rear view image.

It should be noted that although an image for embedding is clipped and embedded from the image of one frame before here, the image of the area corresponding to the current gap area may be further clipped and embedded from the past frame.

Incidentally, in FIG. 11 and the above equation (4), h tan φ is a distance from the position of the camera 10 to a position corresponding to the lower end of the angle of view of the camera 10 and can be determined by calculation, but it is also possible to determine by an actual measurement since the h tan φ is a fixed value for each vehicle body.

Figure 12:
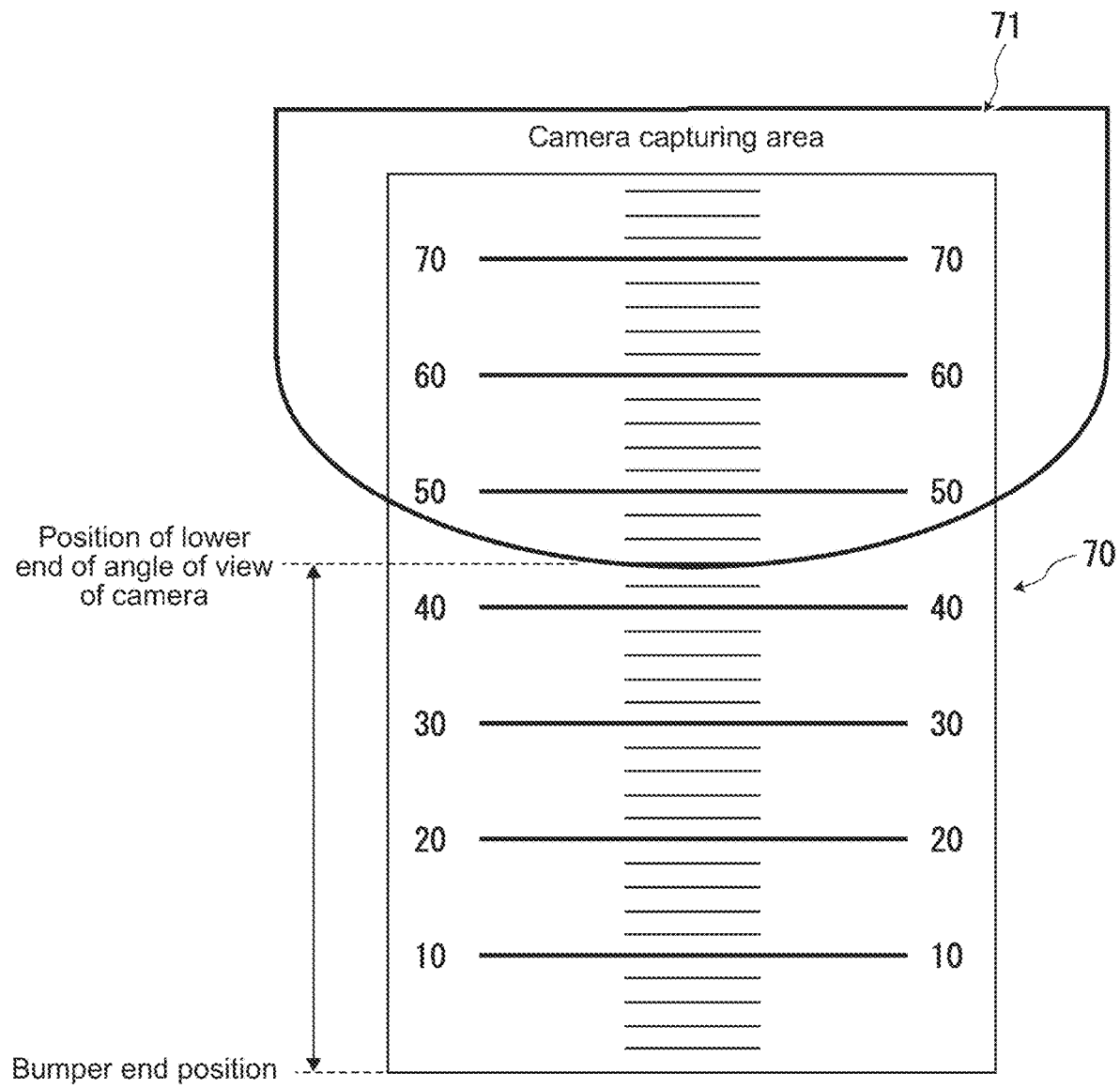
FIG. 12 is a diagram explaining a method of actually measuring a distance from a position of the camera 10 to a position corresponding to a lower end of an angle of view of the camera 10 using a chart.
Figure 13:
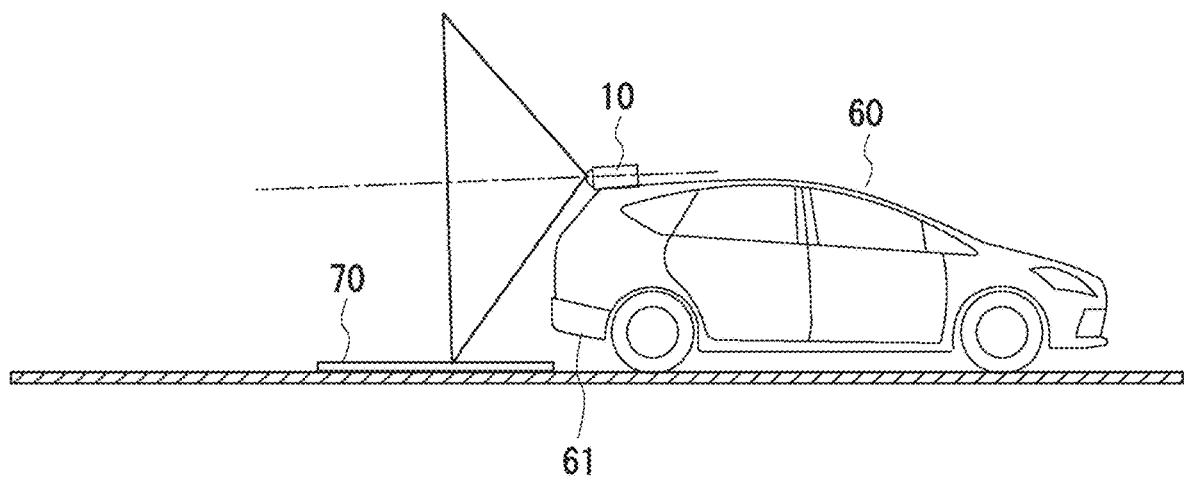
FIG. 13 is a diagram for explaining an installation method of the chart.

FIG. 12 and FIG. 13 are explanatory views of a case where a chart is used for the actual measurement of h tan φ.

As shown in FIG. 12, a chart 70 is, for example, a sheet on which a numerical scale is written in increments of 2 cm and 10 cm. As shown in FIG. 13, at the time of the actual measurement, the chart 70 is arranged on the road surface so as to align a position of a base point (0 point) of the chart 70 with the end of the rear bumper 61 of the vehicle body 60.

The value of the numerical scale visible at a lower end of an angle of view of an image 71 of the camera 10 displayed on the screen from the rear view image captured by the camera 10 can be obtained visually as a distance between the end of the rear bumper 61 to the lower end of the angle of view of the image 71 of the camera 10. In the example of FIG. 12, it can be seen that the distance from the end of the rear bumper 61 to the lower end of the angle of view of the camera 10 is 44 cm. The obtained distance is set in the image processing apparatus 20 by a manual input to the system or the like, and is used for generating a virtual image superimposed rear view image 6.

(6. Switching Rear View Mode)

The rear view signal processing unit 23 has three types of rear view modes, and can switch a display angle of the rear view image on the basis of rear view mode selection information set by the user as appropriate.

The rear view mode includes a normal view mode, a wide view mode, and a top-down view mode. The user can arbitrarily select the rear view mode at any time by an operation button or the like.

Figure 14A:
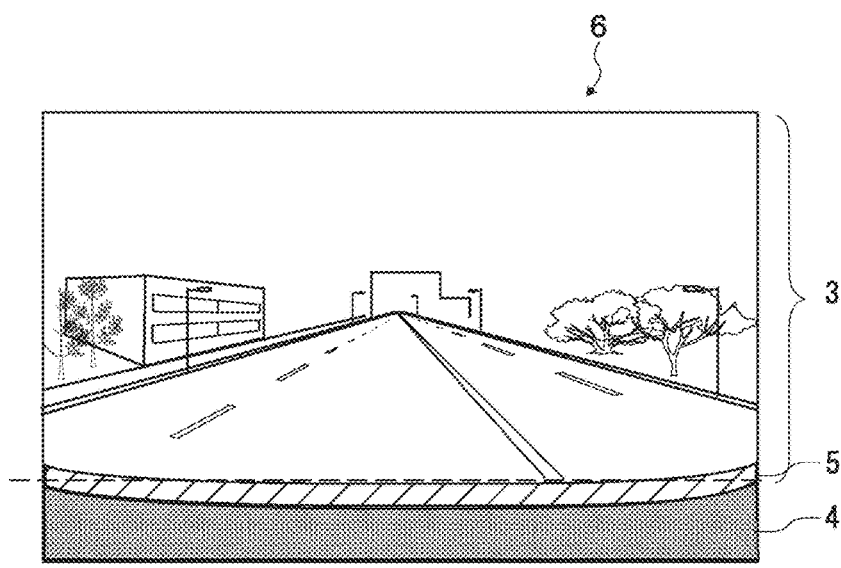
FIG. 14A is a diagram showing an example of a rear view image of a normal view mode.
Figure 14B:
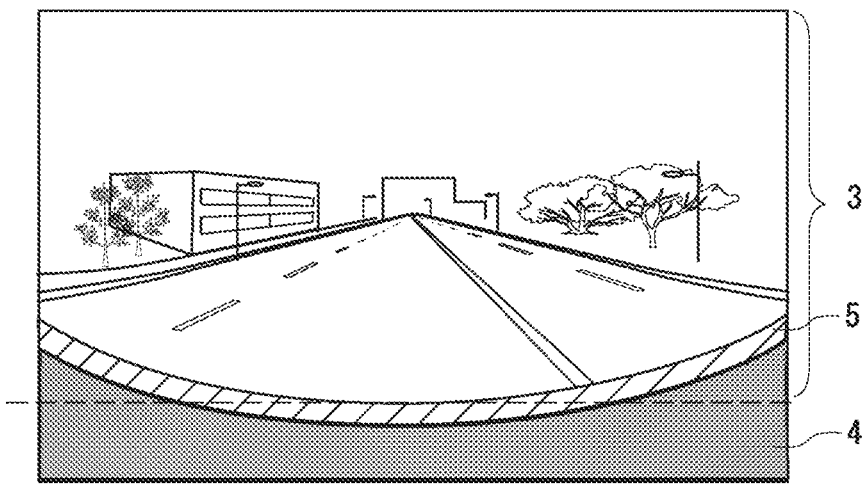
FIG. 14B is a diagram showing an example of a rear view image of a wide view mode.
Figure 14C:
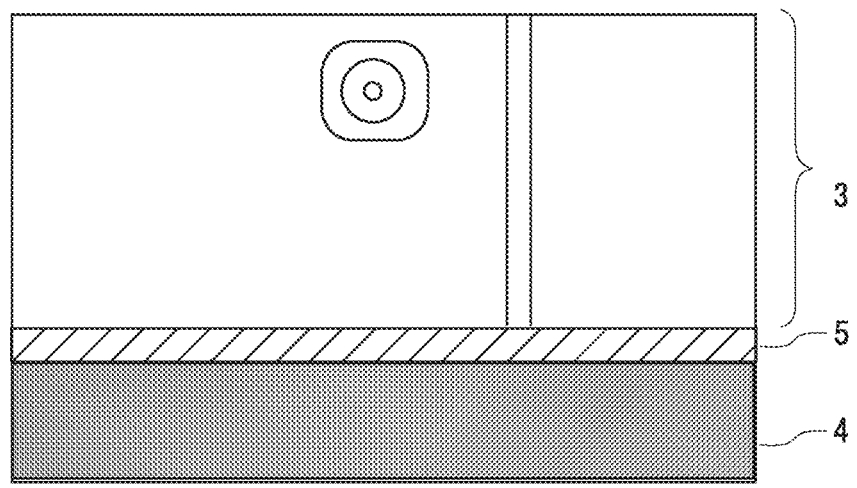
FIG. 14C is a diagram showing an example of a rear view image of a top-down view mode.

FIG. 14A, FIG. 14B, and FIG. 14C are diagrams showing examples of each rear view image of respective modes of the normal view mode, the wide view mode, and the top-down view mode.

The wide view is in a mode to display the rear view image of a wide angle range than a normal view by capturing using a wide angle lens.

Figure 15:
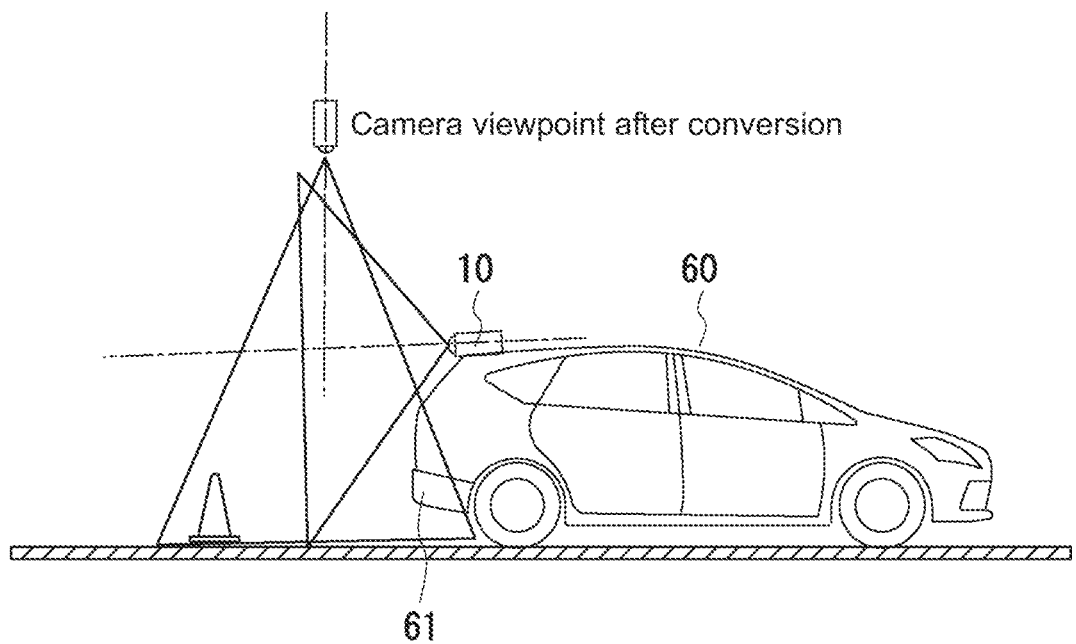
FIG. 15 is a diagram showing a camera viewpoint of the top-down view mode after conversion.

As shown in FIG. 15, the top-down view is in a mode in which the rear view image viewed from substantially directly above the road surface directly behind the vehicle body is displayed by signal processing such as viewpoint conversion from the rear view image of the normal view mode.

The image superimposing unit 24 performs the distortion correction of the virtual image 4 and the embedded image 5 corresponding to the type of the rear view mode.

(7. Overall Control Flow)

Next, a flow of an operation of the rear view signal processing unit 23 and the image superimposing unit 24 in the camera system 100 in the second embodiment will be described.

Figure 16:
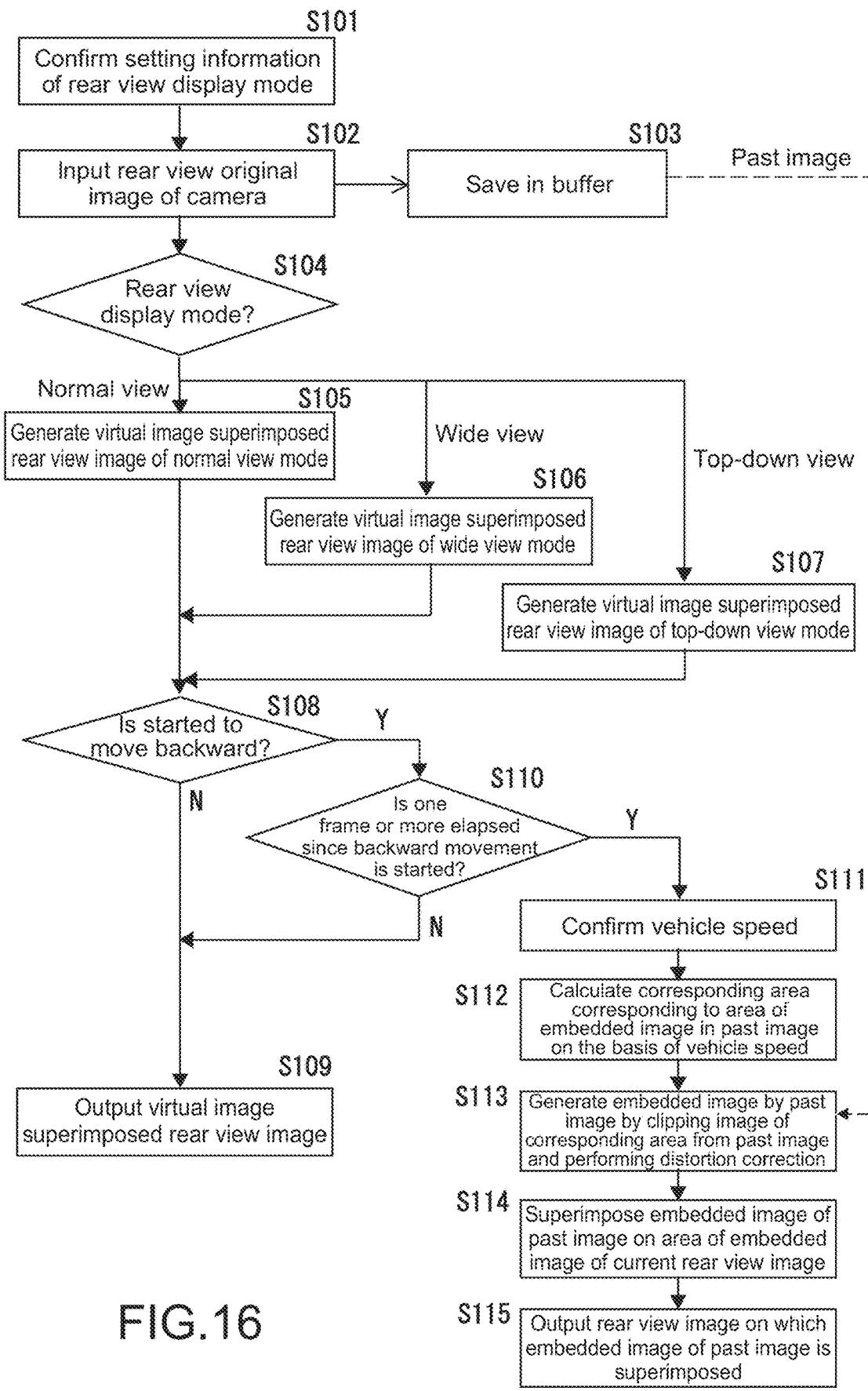
FIG. 16 is a flowchart showing a flow of an overall operation of a rear view signal processing unit 23 and an image superimposing unit 24 in the camera system 100 of the second embodiment.

FIG. 16 is a flowchart showing the flow of an overall operation of the rear view signal processing unit 23 and the image superimposing unit 24 in the camera system 100 in the second embodiment.

The rear view signal processing unit 23 and the image superimposing unit 24, for example, are started by obtaining a status from the ECU 200 indicating that the vehicle body shifts to a back gear, and executes the following control.

After starting, the rear view signal processing unit 23 confirms a rear view display mode and holds the result (Step S101). Subsequently, the rear view signal processing unit 23 inputs the rear view original image captured by the camera 10 through the splitter 21 (Step S102). The inputted rear view original image is held in the buffer in the image processing apparatus 20 (Step S103).

The image superimposing unit 24 generates the virtual image in a form corresponding to the currently selected rear view display mode on the basis of a confirmation result of the rear view display mode, generates the embedded image of the gap between the lower end of the angle of view of the rear view original image and the virtual image, and superimposes the embedded image on the rear view original image to generate the virtual image superimposed rear view image (Step S104, S105, S106, S107).

Next, the image superimposing unit 24 determines whether or not the vehicle body is started to move backward on the basis of the status from the ECU 200 (Step S108). If the vehicle body is not yet started to move backward, the rear view signal processing unit 23 outputs the virtual image superimposed rear view image generated by any of Step S105, S106, or S107 to the rear view display unit 40 (Step S109). At this time, the embedded image in the virtual image superimposed rear view image is a uniform image that can be simply discriminated from the virtual image, such as a hatched image, a shaded image, or a color image.

During a period from when moving backward the vehicle body is started until one frame of time elapses (N in Step S110), the image superimposing unit 24 continues to output the virtual image superimposed rear view image generated by any one of Step S105, S106, or S107 to the rear view display unit 40 (Step S109).

When one frame of time is elapsed since moving backward the vehicle body is started (Y in Step S110), the image superimposing unit 24 acquires the vehicle speed information from the ECU 200 and confirms the value (Step S111). The image superimposing unit 24 reads the rear view original image of a past frame from the buffer, and calculates a corresponding area corresponding to the area of the embedded image in the virtual image superimposed rear view image in the rear view original image of the past frame on the basis of the confirmed vehicle speed (Step S112). Subsequently, the image superimposing unit 24 clips the past image of the corresponding area from the past frame image and performs the distortion correction corresponding to the rear view display mode on the clipped past image to generate an embedded image by the past image (Step S113).

Next, the image superimposing unit 24 superimposes (overwrites) the embedded image of the generated past image on the area of the embedded image of the current virtual image superimposed rear view image (Step S114), thereby completing the virtual image superimposed rear view image on which the virtual image and the embedded image of the past image are superimposed, and outputs the virtual image superimposed rear view image to the rear view displaying unit 40 (Step S115).

(8. Modifications)

In the camera system 100 of the above-described embodiment, the image processing apparatus 20 includes the splitter 21, the CMS signal processing unit 22, the rear view signal processing unit 23, and the image superimposing unit 24, but the present technology is not limited thereto.

(First modification)

Figure 17:
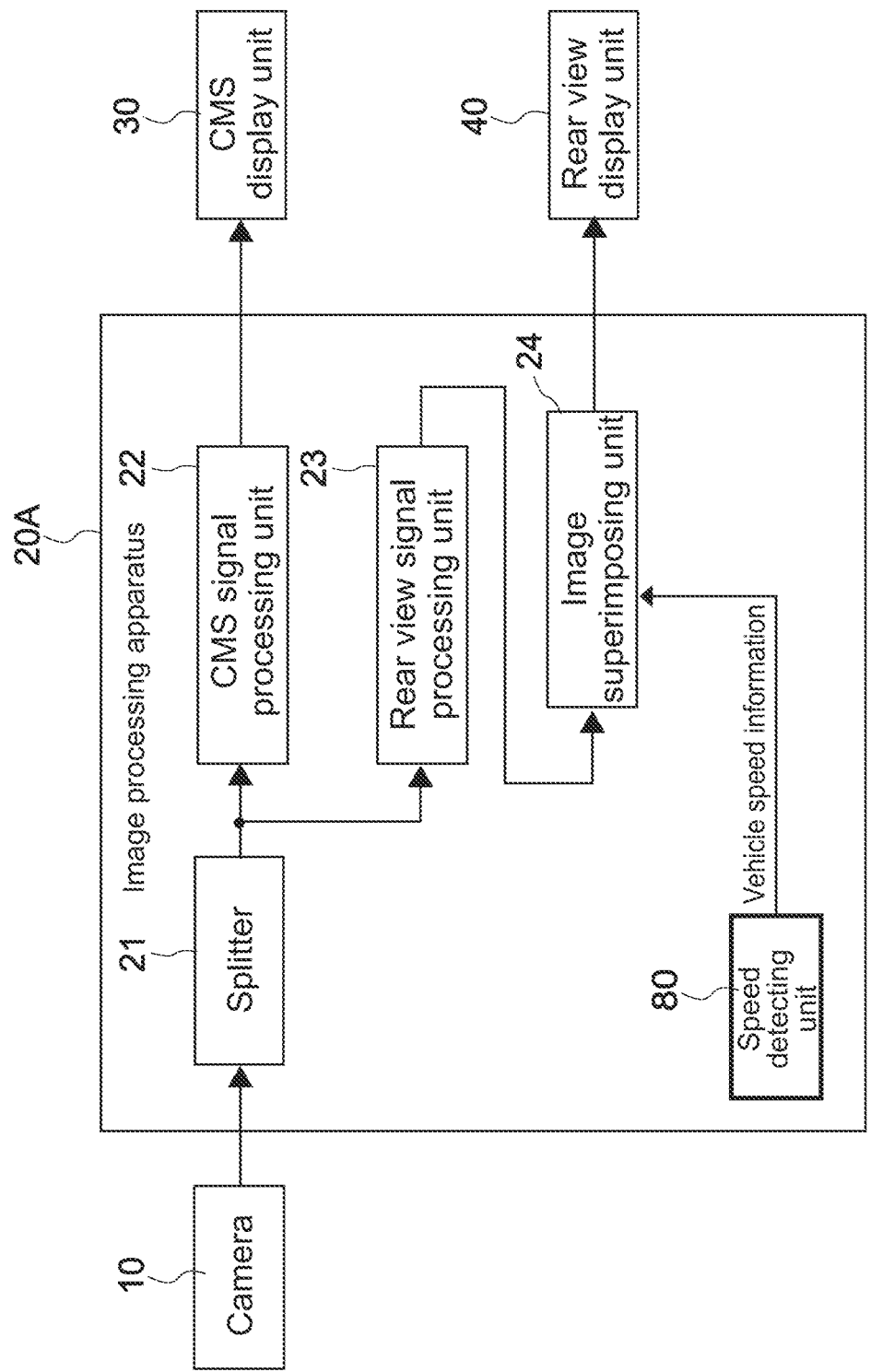
FIG. 17 is a block diagram showing a first modification of a configuration of an image processing apparatus according to the present technology.

For example, as shown in FIG. 17, instead of configuring to acquire the vehicle speed information from the ECU 200, an image processing apparatus 20A may further include a speed detecting unit 80 for detecting the speed of the vehicle body, and the image superimposing unit 24 may acquire the vehicle speed information from the speed detecting unit 80 and adjust the virtual information.

(Second modification)

Figure 18:
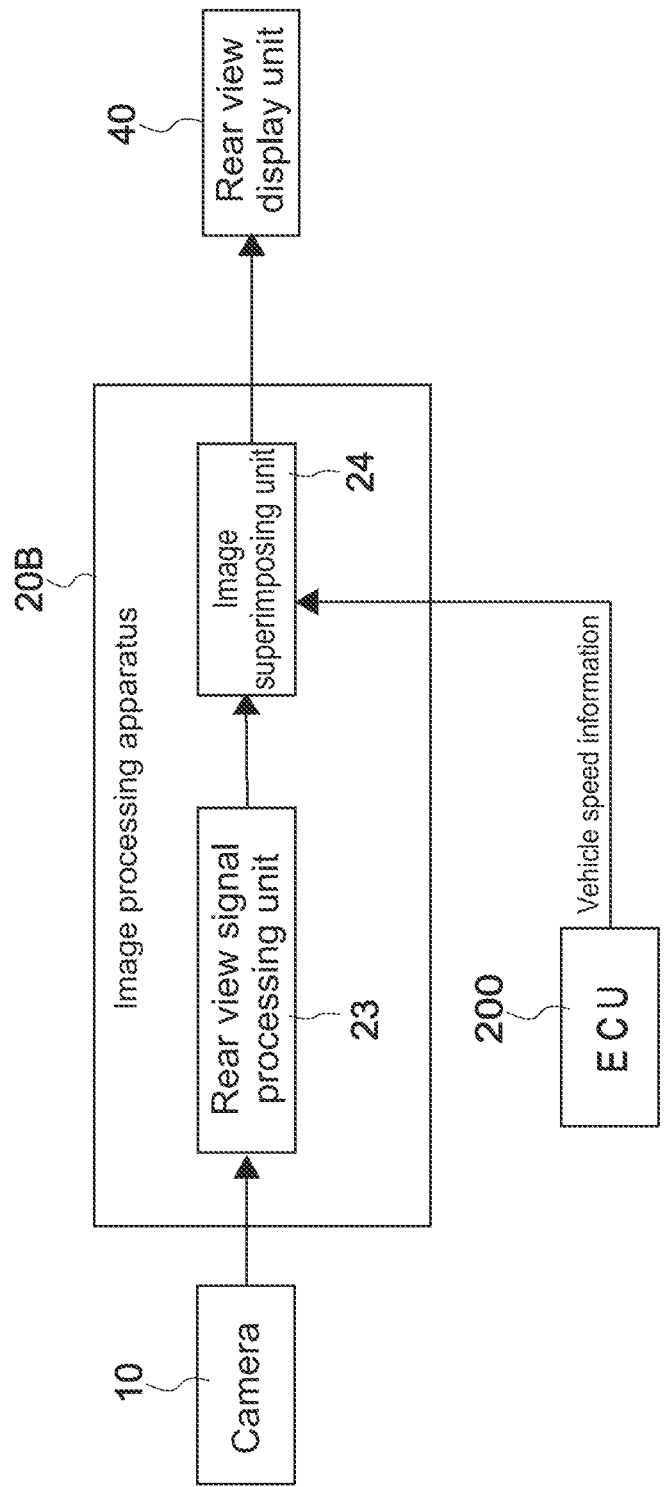
FIG. 18 is a block diagram showing a second modification of a configuration of an image processing apparatus according to the present technology.

As shown in FIG. 18, from the configuration of the image processing apparatus 20 of FIG. 1, at least the CMS signal processing unit 22 is omitted, and an image processing apparatus 20B according to the present technology may be configured by the rear view signal processing unit 23 and the image superimposing unit 24.

(Third modification)

Figure 19:
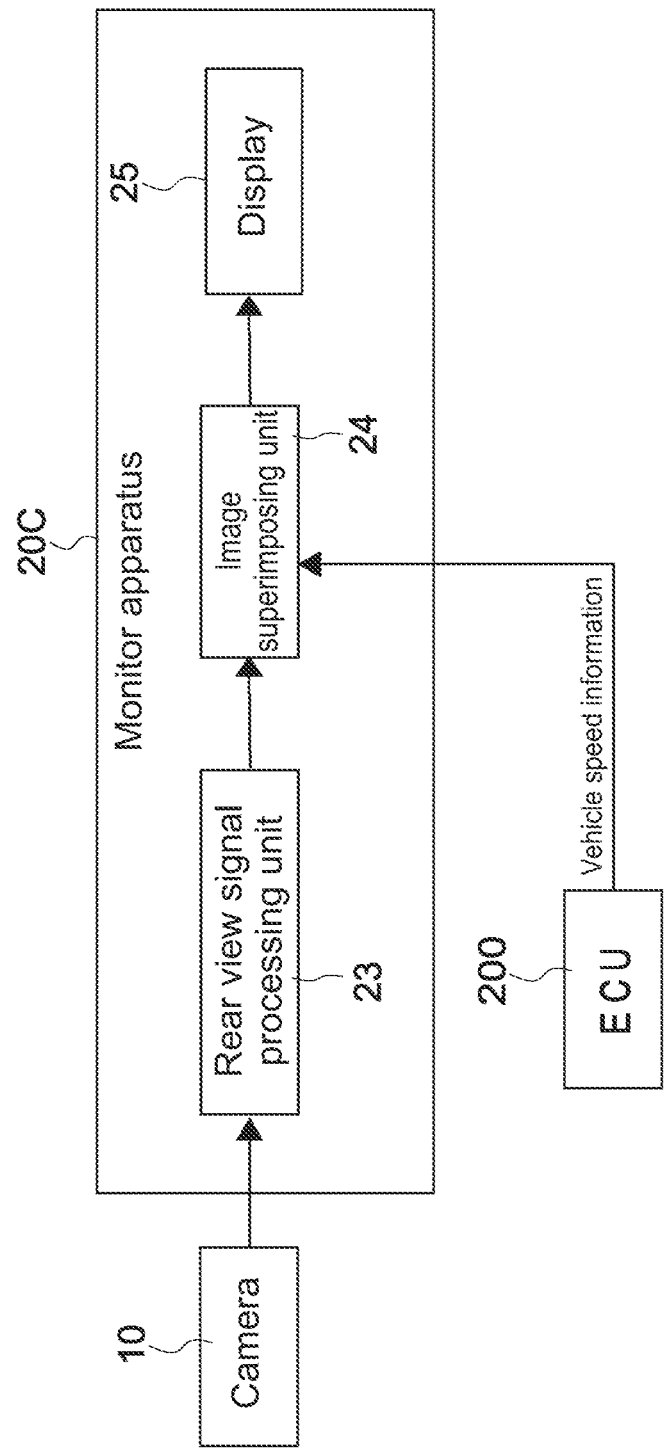
FIG. 19 is a block diagram showing a configuration of a monitor apparatus which is a third modification of an image processing apparatus according to the present technology.

As shown in FIG. 19, the present technology may be provided as a monitor apparatus 20C that internally includes the rear view signal processing unit 23, the image superimposing unit 24, and the display 25 as one system.

Alternatively, it may be provided as a camera apparatus that internally includes the camera including the rear view signal processing unit 23 and the image superimposing unit 24 as one system.

(Fourth Modification)

Figure 20:
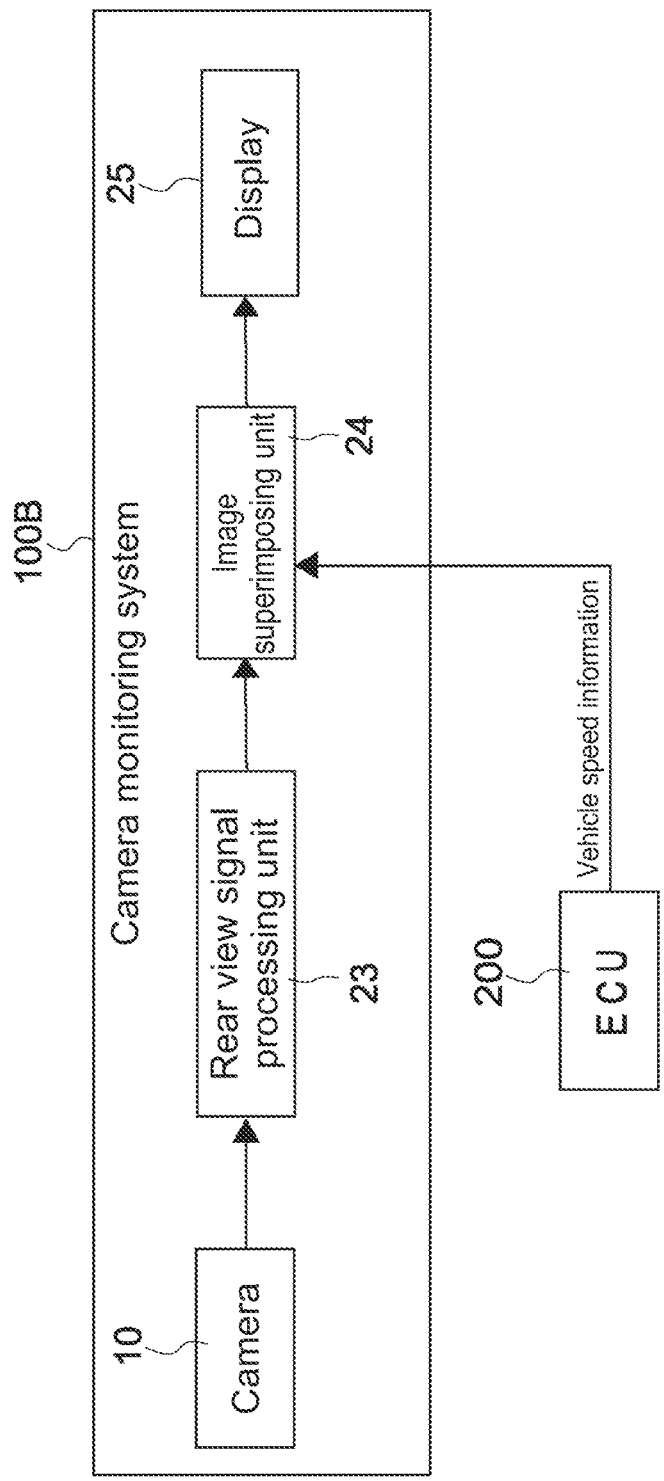
FIG. 20 is a block diagram showing a configuration of a camera system which is a fourth modification of an image processing apparatus according to the present technology.

As shown in FIG. 20, the present technology may also be provided as a camera system 100B with the camera 10, the rear view signal processing unit 23, the image superimposing unit 24, and the display 25 being separate apparatuses.

In addition, a combination of functional blocks internally included in one apparatus may be changed with respect to those shown in FIG. 1, FIG. 17, and FIG. 20.

For example, in FIG. 1, a system may include a camera apparatus that internally includes the camera 10, the splitter 21, the rear view signal processing unit 23, and the image superimposing unit 24, a display apparatus that internally include the CMS signal processing unit 22 and the CMS display unit 30, the rear view display unit 40, and the ECU 200. Also, a system may include a camera apparatus that internally includes the camera 10, the splitter 21, and the CMS signal processing unit 22, a rear view display apparatus that internally includes the rear view signal processing unit 23, the image superimposing unit 24, and the rear view display unit 40, the CMS display unit 30, and the ECU 200.

In each of the above embodiments, the image of the camera attached so as to be capable of capturing, in particular, the rear of the vehicle body, but the present technology is also applicable to a case of using the image of the camera capable of capturing the front and sides of the vehicle body.

In each of the above embodiments, the virtual image 4 of the bumper is superimposed on the camera image as the virtual image 4 of the part of the vehicle body 60, but a location of the part of the vehicle body 60 superimposed on the camera image is not limited in the present technology. Any part may be possible as long as the part does not enter the field of view of the camera 10 installed in the vehicle body 60 and the part is such that the user can easily grasp the sense of distance in the space of the camera image. For example, if the side of the vehicle body is captured by the camera, the virtual image of the side surface of the vehicle body may be superimposed. Furthermore, the virtual image of the bumper should not necessarily be superimposed if the rear and the front of the vehicle body is monitored. For example, a virtual image of a license plate or a part of a silhouette of the vehicle body may be superimposed.

Furthermore, the present technology is not limited to the above-described embodiments, and various modifications may be made without departing from the gist of the present invention.

Furthermore, the present technology may also be configured as follows.

(1) An image processing apparatus, including:
a first signal processing unit for generating a first image of a first angle of view from an image captured by a camera attached to a vehicle body; and
an image superimposing unit for superimposing an image representing a part of the vehicle body on the first image.

(2) The image processing apparatus according to (1), in which the image of the part of the vehicle body is an image stored in advance.

(3) The image processing apparatus according to (2), in which the image stored in advance is an image stored in the first signal processing unit before the image of the camera is acquired.

(4) The image processing apparatus according to any of (1) to (3), in which the image of the part of the vehicle body is an image of an area outside a field of view of the camera.

(5) The image processing apparatus according to any of (2) to (4), in which the image of the part of the vehicle body is a virtual image obtained by virtualizing at least a part of a bumper of the vehicle body.

(6) The image processing apparatus according to any of (1) to (5), in which the camera is a camera attached for capturing a front, a rear or a side of the vehicle body.

(7) The image processing apparatus according to any of (1) to (6), in which the image superimposing unit adjusts the image that is superimposed on the first image on the basis of speed information of the vehicle body.

(8) The image processing apparatus according to any of (1) to (6), in which the image superimposing unit superimposes an embedded image on a gap area in which an image between the first image and the virtual image does not exist.

(9) The image processing apparatus according to (8), in which the embedded image is an image having a hue close to that of the first image adjacent to the gap area.

(10) The image processing apparatus according to (8), in which the image superimposing unit clips an image of an area corresponding to the gap area from the first image in the past to generate the embedded image.

(11) The image processing apparatus according to any of (1) to (10), in which the image superimposing unit outputs an image in which at least the image is superimposed on the first image to a first display unit.

(12) The image processing apparatus according to any of (1) to (11), further including:
a second signal processing unit that generates a second image having a second angle of view different from the first angle of view from the first image and outputs the second image to a second display unit.

(13) The image processing apparatus according to (12), in which a center of the second angle of view is higher than a center of the first angle of view in the first image space.

(14) The image processing apparatus according to (1), in which the first image is an image for rear view.

(15) The image processing apparatus according to (12), in which the second image is an image equivalent to a room mirror image.

(16) A camera system, including:
a camera attached to a vehicle body;
a first signal processing unit for generating a first image of a first angle of view from an image captured by the camera; and
an image superimposing unit for superimposing an image representing a part of the vehicle body to the first image.

(17) The camera system according to (16), in which the image of the part of the vehicle body is an image stored in advance.

(18) The camera system according to (17), in which the image stored in advance is an image stored in the first signal processing unit before the image of the camera is acquired.

(19) The camera system according to any of (16) to (18), in which the image of the part of the vehicle body is an image of an area outside a field of view of the camera.

(20) The camera system according to any of (17) to (19), in which the image of the part of the vehicle body is a virtual image obtained by virtualizing at least a part of a bumper of the vehicle body.

(21) The camera system according to any of (16) to (20), in which the camera is a camera attached for capturing a front, a rear or a side of the vehicle body.

(22) The camera system according to any of (16) to (21), in which the image superimposing unit adjusts the image that is superimposed on the first image on the basis of speed information of the vehicle body.

(23) The camera system according to any of (16) to (21), in which the image superimposing unit superimposes an embedded image on a gap area in which an image between the first image and the virtual image does not exist.

(24) The camera system according to (23), in which the embedded image is an image having a hue close to that of the first image adjacent to the gap area.

(25) The camera system according to (23), in which the image superimposing unit clips an image of an area corresponding to the gap area from the first image in the past to generate the embedded image.

(26) The camera system according to any of (23) to (25), in which the image superimposing unit outputs an image in which at least the image is superimposed on the first image to a first display unit.

(27) The camera system according to any of (16) to (26), further including:

a second signal processing unit that generates a second image having a second angle of view different from the first angle of view from the first image and outputs the second image to a second display unit.

(28) The camera system according to (27), in which a center of the second angle of view is higher than a center of the first angle of view in the first image space.

(29) The camera system according to (16), in which the first image is an image for rear view.

(30) The camera system according to (27), in which the second image is an image equivalent to a room mirror image.

(31) A monitor apparatus, including:

a first signal processing unit for generating a first image of a first angle of view from an image captured by a camera attached to a vehicle body;

an image superimposing unit for superimposing an image representing a part of the vehicle body to the first image; and a display unit for displaying the superimposed image.

(32) The monitor apparatus according to (31), in which the image of the part of the vehicle body is an image stored in advance.

(33) The monitor apparatus according to (32), in which the image stored in advance is an image stored in the first signal processing unit before the image of the camera is acquired.

(34) The monitor apparatus according to any of (31) to (33), in which the image of the part of the vehicle body is an image of an area outside a field of view of the camera.

(35) The monitor apparatus according to any of (31) to (34), in which the image of the part of the vehicle body is a virtual image obtained by virtualizing at least a part of a bumper of the vehicle body.

(36) The monitor apparatus according to any of (31) to (35), in which the camera is a camera attached for capturing a front, a rear or a side of the vehicle body.

(37) The monitor apparatus according to any of (31) to (36), in which the image superimposing unit adjusts the image that is superimposed on the first image on the basis of speed information of the vehicle body.

(38) The monitor apparatus according to any of (31) to (36), in which the image superimposing unit superimposes an embedded image on a gap area in which an image between the first image and the virtual image does not exist.

(39) The monitor apparatus according to (38), in which the embedded image is an image having a hue close to that of the first image adjacent to the gap area.

(40) The monitor apparatus according to (37), in which the image superimposing unit clips an image of an area corresponding to the gap area from the first image in the past to generate the embedded image.

(41) The monitor apparatus according to (31), in which the first image is an image for rear view.

(42) An image processing method, including:

generating a first image of a first angle of view from an image captured by a camera attached to a vehicle body by a first signal processing unit; and superimposing an image representing a part of the vehicle body on the first image by an image superimposing unit.

(43) The image processing method according to (42), in which the image of the part of the vehicle body is an image stored in advance.

(44) The image processing method according to (43), in which the image stored in advance is an image stored in the first signal processing unit before the image of the camera is acquired.

(45) The image processing method according to any of (42) to (44), in which the image of the part of the vehicle body is an image of an area outside a field of view of the camera.

(46) The image processing method according to any of (42) to (44), in which the image of the part of the vehicle body is a virtual image obtained by virtualizing at least a part of a bumper of the vehicle body.

(47) The image processing method according to any of (42) to (46), in which the camera is a camera attached for capturing a front, a rear or a side of the vehicle body.

(48) The image processing method according to any of (42) to (47), in which the image superimposing unit adjusts the image that is superimposed on the first image on the basis of speed information of the vehicle body.

(49) The image processing method according to any of (42) to (47), in which the image superimposing unit superimposes an embedded image on a gap area in which an image between the first image and the virtual image does not exist.

(50) The image processing method according to (49), in which the embedded image is an image having a hue close to that of the first image adjacent to the gap area.

(51) The image processing method according to (49), in which the image superimposing unit clips an image of an area corresponding to the gap area from the first image in the past to generate the embedded image.

(52) The image processing method according to any of (42) to (51), in which the image superimposing unit outputs an image in which at least the image is superimposed on the first image to a first display unit.

(53) The image processing method according to any of (42) to (52), further including:

a second signal processing unit that generates a second image having a second angle of view different from the first angle of view from the first image and outputs the second image to a second display unit.

(54) The image processing method according to (53), in which a center of the second angle of view is higher than a center of the first angle of view in the first image space.

(56) The image processing method according to (42), in which the first image is an image for rear view.

(57) The image processing method according to (53), in which the second image is an image equivalent to a room mirror image.

REFERENCE SIGNS LIST 1 camera image
3 rear view original image
4 virtual image
5 embedded image
6 rear view image
10 camera
20, 20A, 20B image processing apparatus
20C monitor apparatus
22 CMS signal processing unit
23 rear view signal processing unit
24 image superimposing unit
30 CMS display unit
40 rear view display unit
60 vehicle body
61 rear bumper
80 speed detecting unit
100 camera system
100B camera monitoring system
200 ECU

The invention claimed is:

1. An image processing apparatus, comprising:
processing circuitry configured to:
generate a first image of a first angle of view from an image captured by a camera attached to a vehicle body;
superimpose a virtual image representing a part of the vehicle body on the first image; and
superimpose an embedded image on a gap area in which an image between the first image and the virtual image does not exist.

2. The image processing apparatus according to claim 1, wherein the image of the part of the vehicle body is an image stored in advance.

3. The image processing apparatus according to claim 2, wherein the image stored in advance is an image stored before the image of the camera is acquired.

4. The image processing apparatus according to claim 3, wherein the image of the part of the vehicle body is an image of an area outside a field of view of the camera.

5. The image processing apparatus according to claim 4, wherein the image of the part of the vehicle body is a virtual image obtained by virtualizing at least a part of a bumper of the vehicle body.

6. The image processing apparatus according to claim 5, wherein the camera is a camera attached for capturing a front, a rear or a side of the vehicle body.

7. The image processing apparatus according to claim 6, wherein the processing circuitry is configured to adjust the image that is superimposed on the first image on a basis of speed information of the vehicle body.

8. The image processing apparatus according to claim 1, wherein the embedded image is an image having a hue close to that of the first image adjacent to the gap area.

9. The image processing apparatus according to claim 8, wherein the processing circuitry is configured to clip an image of an area corresponding to the gap area from the first image to generate the embedded image.

10. The image processing apparatus according to claim 1, wherein the processing circuitry is configured to output an image in which at least the image is superimposed on the first image to a first display unit.

11. The image processing apparatus according to claim 1, wherein the processing circuitry is further configured to generate a second image having a second angle of view different from the first angle of view from the first image and output the second image to a second display unit.

12. The image processing apparatus according to claim 11, wherein the second image is an image equivalent to a room minor image.

13. The image processing apparatus according to claim 1, wherein the first image is an image for rear view.

14. An image processing apparatus, comprising:
processing circuitry configured to:
generate a first image of a first angle of view from an image captured by a camera attached to a vehicle body;
superimpose a virtual image representing a part of the vehicle body on the first image;
generate a second image having a second angle of view different from the first angle of view from the first image and output the second image to a second display unit,
wherein a center of the second angle of view is higher than a center of the first angle of view in the first image.

15. A camera system, comprising:
a camera attached to a vehicle body; and
processing circuitry configured to:
generate a first image of a first angle of view from an image captured by the camera;
superimpose a virtual image representing a part of the vehicle body to the first image; and
superimpose an embedded image on a gap area in which an image between the first image and the virtual image does not exist.

16. An image processing method executed by processing circuitry, the method comprising:
generating a first image of a first angle of view from an image captured by a camera attached to a vehicle body by a first signal processing unit;
superimposing a virtual image representing a part of the vehicle body on the first image by an image superimposing unit; and superimposing an embedded image on a gap area in which an image between the first image and the virtual image does not exist.

* * * * *